(No Model.)
J. B. DAY & T. J. GREGORY.
CULTIVATOR.
No. 285,469. Patented Sept. 25, 1883.
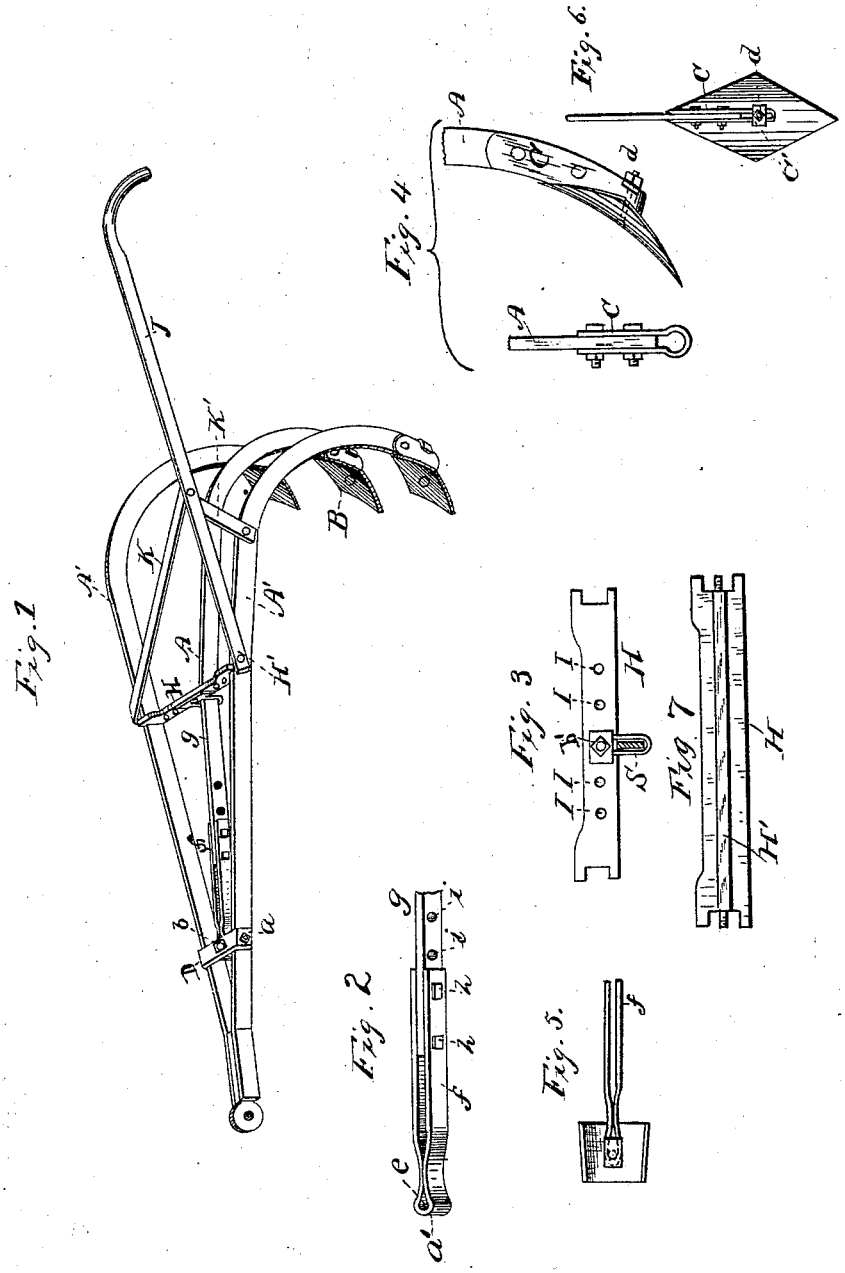
WITNESSES
Chas. R. Burr
W. E. Bowen
INVENTORS.
John B. Day
Thomas J. Gregory
By Alferd Ifo Attorneys.

UNITED STATES PATENT OFFICE.

JOHN B. DAY AND THOMAS J. GREGORY, OF CORNELL, ILLINOIS.

CULTIVATOR.

SPECIFICATION forming part of Letters Patent No. 285,469, dated September 25, 1883.

Application filed July 5, 1883. (No model.)

*To all whom it may concern:*

Be it known that we, J. B. DAY and T. J. GREGORY, citizens of the United States of America, residing at Cornell, in the county of Livingston and State of Illinois, have invented certain new and useful Improvements in Cultivators, of which the following is a specification, reference being had therein to the accompanying drawings.

This invention pertains to an improvement in cultivators, particularly gang-cultivators, and is characteristic for its ready adaptation to the gang-cultivators now in use, and for cultivating oats, pulverizing the ground, field-plowing, &c., the nature of said invention consisting of an additional shovel or plow standard capable of ready attachment to and detachment from the ordinary cultivator, in the method of securing the shovel to the plow-beam, adjusting the length and position of the shovel and plow standard with relation to the plow-standards connected therewith, and of certain details of construction and arrangement of parts, substantially as hereinafter more fully set forth and claimed.

In the accompanying drawings, Figure 1 shows a view in perspective of a gang-cultivator embodying our improvement, and Figs. 2, 3, 4, 5, 6, and 7 are detail views.

In carrying into effect our invention we construct a shovel or plow beam, A, similar to the beams A' A' of the ordinary gang-cultivator, constructing it, preferably, of metal, its greater portion being made to extend horizontally in the direction of the length of the cultivator, while its remaining rear portion is curved downward. The forward end of this beam A is capable of ready attachment to, and detachment from, the cross connecting-bar D of the forward convergent ends of the shovel or plow beams A', to enable it to be readily applied for use or readily removed when not required. The means for its attachment and detachment, as aforesaid, consist, preferably, of a T-piece clip, a, Fig. 2, adapted to fit over the sides of the convergent ends of the plow-beams A', to which it is bolted, of a loop, a', strapped to the forward end of the said plow-beam, and formed with an eye, e, through which passes a bolt or stud, b, Fig. 1, depending from the T-piece or clip a, said bolt being headed at its lower end, to prevent the same from coming out of the eye of the loop, and nutted at its upper end. The horizontal portion of the beam A is made in two parts—a shorter, f, and a longer one, g, the latter being adapted to fit into the former, and each being provided with a series of coincident apertures with adjusting bolts or pins h, to permit of the lengthening or shortening of the beam to adapt it to different-sized cultivators. The rear downward-curved portion of the beam A has adjustably connected thereto, as has also each of the same portions of the other beams, a shovel or plow, B. The shovel or plow is secured to beam A by means of a socket, c, Fig. 6, fastened to the rear side of the shovel or plow, and adapted to receive the lower end of beam A, and having an apertured cross-piece, C', on its rear open side, through which and the shovel is inserted a bolt, d. The brace-bar H is recessed at either end, as shown in Fig. 3, for reception of the beams A', and it is secured in position by the nutted bar H', which also projects through the handle J, which is additionally braced by the bars K and K'. The brace-bar H is also provided with the orifices I, for adjusting the staple S, by means of which the cultivator-shovel of beam A may be shifted to the right or left of a central position between the corresponding shovels, the staples S being secured by a nutted horizontal bolt, b', as shown. This third shovel-beam attachment of the ordinary two-shovel-beam gang-cultivator, among other advantages, adapts the cultivator for the cultivation of oats, pulverizing the ground, field-plowing, &c.

We claim and desire to secure by Letters Patent—

1. In a gang-cultivator, the shovel-beam A, having eye e, in combination with a T-clip having a depending bolt for securing beam A, brace-bar H, and adjustable staple S, substantially as shown and described.

2. In a gang-cultivator, the third shovel-beam removably secured by means of a clip having a depending bolt, brace-bar, and beam loop staple, substantially as shown and described.

3. In a gang-cultivator, the third shovel-beam removably secured by means of a clip having a depending bolt, brace-bar H, having orifices for reception of a staple, and beam loop staple for adjusting the third shovel, all substantially as shown and described.

4. In a cultivator, the combination of the shovel-beam composed of adjustable parts $f$ and $g$, with the T-clip, brace-bar H, and adjustable staple S, substantially as shown and for the purpose described.

In testimony whereof we affix our signatures in presence of two witnesses.

JOHN B. DAY.
THOMAS J. GREGORY.

Witnesses:
B. R. JOHNSON,
GEO. W. MINER.